P. N. MADSEN.
AUTOMOBILE LOCK.
APPLICATION FILED JULY 19, 1917.
1,356,645.
Patented Oct. 26, 1920.
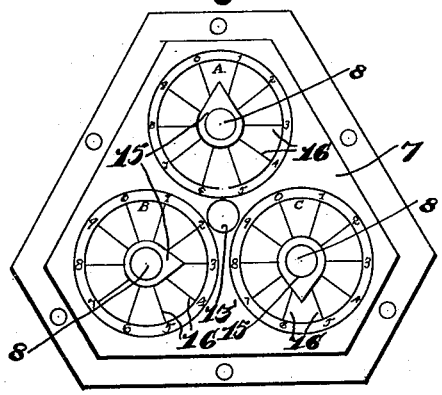
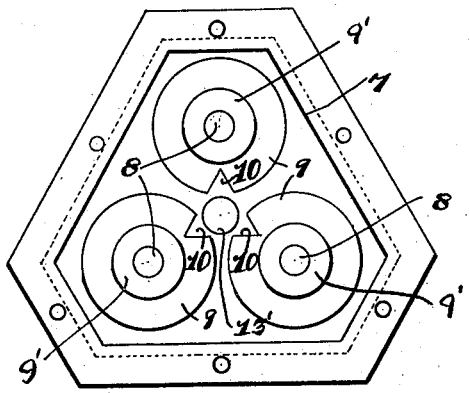
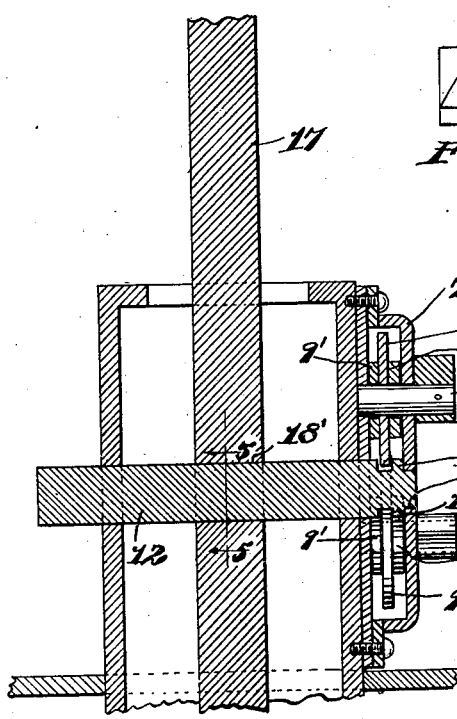
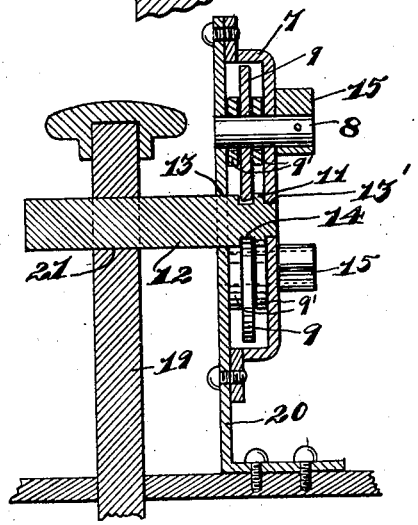
Witnesses
Willis King
A. A. Olson
Inventor
Peter N. Madsen
By Joshua R. H. Potts
his Attorney

UNITED STATES PATENT OFFICE.

PETER N. MADSEN, OF DETROIT, MICHIGAN.

AUTOMOBILE-LOCK.

1,356,645.  Specification of Letters Patent.  Patented Oct. 26, 1920.

Application filed July 19, 1917. Serial No. 181,481.

*To all whom it may concern:*

Be it known that I, PETER N. MADSEN, a citizen of the United States, and a resident of the city of Detroit, county of Wayne, and State of Michigan, have invented certain new and useful Improvements in Automobile-Locks, of which the following is a specification.

My invention relates to improvements in automobile locks, and has for its object the provision of a device of this character through the medium of which an automobile may be readily and easily locked against surreptitious removal, and further, a device which will be of durable and economical construction, and highly efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a central section through a locking device embodying the invention showing the same applied to the control lever of an automobile, Fig. 2, a view similar to Fig. 1 showing the device applied to the starting pedal of an automobile, Fig. 3, a front elevation of the device, Fig. 4, a rear elevation of the combination lock of the device, with the rear plate of the casing thereof removed, Fig. 5, a section taken on line 5—5 of Fig. 1, and Fig. 6, an end elevation of the key included in the construction.

The preferred form of construction as illustrated in the drawings, comprises a combination lock consisting of a casing 7 in which is rotatably mounted a plurality of shafts 8 to which are fixed disks 9 inclosed in said casing. Washers 9' are arranged at opposite sides of each disk 9 in order to position the same substantially centrally between the front and back walls of the casing.

Formed in the peripheries of the disks 9 are V-shaped notches 10 adapted, when said disks are rotatably adjusted to certain positions, as seen in Fig. 4, to permit of the passage of the triangularly formed end 11 of a locking bar 12 which end is inserted into the casing 7 through an opening 13 in the rear wall of said casing. The front wall of said casing is formed with a circular opening 13' for the snug reception of the reduced circularly formed end of the bar 12, as seen in the several views. Formed in said bar adjacent said end thereof is a circumferential groove 14 adapted, after the end of the bar has been inserted to position between the disks 9 to permit of rotative adjustment of said disks in order to lock the bar in position, as clearly seen in Figs. 1 and 2, it being clear that, after insertion of the end of the bar, as mentioned, upon rotative adjustment of said disks so as to destroy the combination of said disks wherein the notches 10 thereof are in registration as seen in Fig. 4, the peripheries of said disks will engage behind the triangularly formed end portion 11 of the bar and thus lock the same in position. Subsequent detachment of the bar may be effected only upon rotative adjustment of said disks to secure the proper combination or adjustment thereof wherein the notches 10 will again be in coöperative registration. Such rotative adjustment of said disks is effected by means of exteriorly positioned finger pieces 15 which are pointed at one side for coöperation with graduations 16 arranged upon the front side of the casing. The combination, that is the proper positioning of the finger pieces 15 relative to these graduations 16, will be known only to the owner of the automobile so that operation of the lock may be effected only by the owner or operator of the automobile.

The device may be used in connection with any of the movable control parts of the automobile, as for instance the control lever 17, the device being suitably mounted or anchored adjacent the lever, and said lever being formed with an opening 18' for the insertion of the locking bar therethrough. When the locking member is in engagement with the lever the same will be positively locked against pivotal movement, thus precluding shifting of the gears and hence operation of the automobile. Or the device may be used in connection with the starting pedal of the automobile as seen at 19. In this use the combination lock will be suitably mounted adjacent said pedal as on a suitably arranged bracket 20, said pedal being formed with an opening 21 for engagement with the locking member. The locking member will be disengaged from the lock except when it is desired to lock the automobile. In this event the locking member will be inserted through the lever or pedal to be locked and then into the combination lock to which the same will be fastened by proper manipulation of the finger pieces 15. When the locking member is thus engaged with pedal 19 the latter will be locked against depression and hence the automobile will be locked against operation until the return of the owner or operator who may adjust the combination lock in order to release the key.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

In an automobile lock, the combination with a movable control member of the automobile to be locked, said member having an opening therein; a housing surrounding said control member and having openings in opposite sides thereof arranged to aline with the opening in said control member; a locking member adapted to project through the openings in said housing and the opening in said control member to lock the latter against movement; an anchored combination lock; a casing for said lock having openings therein alined with said housing openings and through which said locking member is adapted to pass; a plurality of disks rotatably mounted in said casing, having notches in their peripheries adapted, when said disks are adjusted to a certain position, to permit the passage into said casing of one end of said locking member; a circumferential groove in said locking member adapted for engagement by said disks when the latter are turned from said position; means for maintaining said disks in alinement with the operative plane of said groove while said locking member is detached; exteriorly positioned finger pieces for rotatably adjusting said disks; and graduations arranged on said casing for coöperation with said finger pieces and the adjustment thereof, substantially as described.

In testimony whereof I have signed my name to this specification in the presence of two subscribing witnesses.

PETER N. MADSEN

Witnesses:
JOHN C. TRENOR,
EDWARD SALTRY.